(12) United States Patent
Chung et al.

(10) Patent No.: US 6,245,265 B1
(45) Date of Patent: Jun. 12, 2001

(54) METHOD OF FORMING A DIE-CASTABLE HOLLOW CORE ACTUATOR ARM WITH IMPROVED DAMPING

(75) Inventors: Gwendolyn Jones Chung; Walter Lloyd Prater, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,635

(22) Filed: Jun. 23, 1999

(51) Int. Cl.[7] .............................. B29C 39/26; B29C 44/18
(52) U.S. Cl. .................... 264/46.6; 264/250; 264/267; 264/317; 164/132
(58) Field of Search .................................. 264/317, 267, 264/46.6, 250; 164/132

(56) References Cited

U.S. PATENT DOCUMENTS

| | | | |
|---|---|---|---|
| 3,701,379 | * 10/1972 | Fassler et al. ....................... | 164/132 |
| 3,916,511 | * 11/1975 | Brehe ................................... | 249/62 |
| 4,144,466 | 3/1979 | Hatch ................................... | 310/13 |
| 4,297,308 | * 10/1981 | Popplewell .......................... | 264/46.6 |
| 4,590,026 | * 5/1986 | Goto .................................... | 264/317 |
| 4,614,627 | * 9/1986 | Curtis et al. .......................... | 249/62 |
| 4,710,276 | * 12/1987 | Kull ..................................... | 204/9 |
| 4,906,518 | 3/1990 | Inabata ................................. | 428/218 |
| 5,165,464 | 11/1992 | Donahue et al. ..................... | 164/113 |
| 5,303,761 | 4/1994 | Flessner et al. ...................... | 164/15 |
| 5,408,372 | 4/1995 | Karam, II ............................. | 360/104 |
| 5,627,701 | 5/1997 | Misso et al. .......................... | 360/106 |
| 5,771,135 | 6/1998 | Ruiz et al. ............................ | 360/104 |
| 5,796,553 | 8/1998 | Tangren ............................... | 360/104 |
| 5,801,905 | 9/1998 | Schirle et al. ........................ | 360/104 |
| 5,803,151 | 9/1998 | Carden ................................. | 164/5 |
| 5,975,189 | * 11/1999 | Nemoto ............................... | 164/132 |

FOREIGN PATENT DOCUMENTS

| | | | |
|---|---|---|---|
| 51-50218 | * 5/1976 | (JP) ...................................... | 164/132 |
| 52-15446 | * 4/1977 | (JP) ...................................... | 164/132 |
| 53-1127 | * 1/1978 | (JP) ...................................... | 164/132 |
| 58-147333 | * 9/1983 | (JP) ...................................... | 264/317 |
| WO 84/03857 | * 10/1984 | (WO) ................................... | 264/317 |
| WO 96/18749 | 6/1996 | (WO) . | |

OTHER PUBLICATIONS

A.I. "Ed"Nussbaum, "Semi–Solid Forming of Aluminum and Magnesium", Light Metal Age, Jun. 1996, pp. 6–8, 10, 12, 14, 16, 18, 20, 22.

United States Statutory Invention Registration No. H1573, Aug. 1996.

Hiroshi Koriyama, Arm For Positioning Carriage Of Magnetic Disk Device, Sep. 14, 1998, p. 1.

Monolithic Composite Actuator Comb, Research Disclosure, Feb., 1992 No. 334.

\* cited by examiner

*Primary Examiner*—Allan R. Kuhns
(74) *Attorney, Agent, or Firm*—Robert B. Martin; Bracewell & Patterson, L.L.P.

(57) ABSTRACT

A method of forming an computer component having improved damping capability is described. The method comprises providing a die for forming an computer component, inserting a water soluble salt block having a desired hollowing form into the die, and injecting formable material such as die-castable or thixoformable material in fluid form into the die such that the fluid forms around the salt block and substantially covers the salt block. Once the formable material solidifies to form the computer component, the solid computer component is subjected to pressurized steam to dissolve the salt within the solid component, thus leaving a hollow core of the desired hollowing form. The salt block can have at least one which forms an outlet opening in the solid computer component. The computer component can be, for example, an computer arm or an E-block for a computer hard drive.

8 Claims, 6 Drawing Sheets

METHOD OF FORMING A DIE-CASTABLE HOLLOW CORE ACTUATOR ARM WITH IMPROVED DAMPING

BACKGROUND OF THE INVENTION

1. Technical Field

The present invention relates in general to a method of hollow core die-casting or thixoforming computer components and in particular to an actuator component for a computer hard drive having improved damping. Still more particularly, the present invention relates to computer hard drive actuator arms and E-blocks having a unitary body and a hollow core that can be filled with substances to improve the damping performance of the actuator arm or E-block.

2. Description of the Related Art

Computer hard drives that utilize a read/write head mounted on an air-bearing slider require optimal performance in order to achieve fast and accurate data retrieval and recording. In such systems, the slider is typically mounted onto an actuator arm or series of actuator arms, called an E-block. The actuator arm(s) holds the slider over the magnetic data storage medium, typically a moving disk. Due to the minute and rapid movement required of the slider to read and write data, the design and manufacture of the actuator arm is particularly critical.

In a computer hard drive, or magnetic disk drive, one or more magnetic disks are mounted on a spindle which rotates the disk(s) typically between 3000 and 15,000 revolutions per minute while the slider "flies" over the disks on the air-bearing generated by the compression of the air passing underneath the slider. The actuator arm on which the slider is mounted is a rigid support that moves the slider in order to locate the magnetic read/write head over the appropriate place on the disk.

The most common type of actuator arm is actually a series of arms stacked at a specified distance from one another called an E-block. Ideally, the E-block actuator arms should be stiff, and the inertia of its lateral movement across the disk minimized. This makes data access or reading time faster with smaller power requirements. A stiffer system will respond faster, as greater stiffness minimizes the time it takes the arm to "settle" or cease vibration. To reduce the settling time, the arm(s) should be have a large damping capability.

Properties of an actuator arm most important to the present invention relate to the actuator arm's structural response to an input disturbance. The response is head off-track amplitude (gain) and the input disturbance is a swept sine frequency to the voice coil motor ("VCM") used to drive the actuator arm in an arc across a moving disk. The response is a transfer function which is the output divided by the input for each frequency. There are four main actuator mode shapes that drive the off-track response. In ascending order of frequency they are: (1) butterfly mode, (2) S-mode, (3) M-mode, and (4) end arm mode. In general, it is desirable to have separation of frequencies of each arm so that the gains do not superimpose additively, thus low gain is best. Further, higher frequencies are good, especially if the frequency is greater than that of the sample rate or Nyquist frequency. Damping of a mode will absorb energy at that frequency, thus lowering gain and improving the disk drive performance.

Damping can be improved in actuator arms through adjustment of the material density of the arm, flexural modulus, and specific flexural modulus. A low material density is desired because a low density allows more material to be used to improve the stiffness of the E-block, while maintaining low mass and thus low inertia. A low material density can reduce cost by eliminating the need for incorporating weight reducing holes into the product. Including weight reducing holes in an E-block requires additional manufacturing steps which adds additional costs. Further, the holes may induce air turbulence which affects the performance of the head assemblies as they "fly" over the surface of the disk. Although Schirle et al. (U.S. Pat. No. 5,801,905) use this technique, subsequently filling the cutouts with lightweight plastic, this further processing adds even more to the cost of manufacturing the arm. Further, it may be difficult to ensure that the cutouts are filled such that the actuator arm surfaces are smooth and thus, do not cause air turbulence.

In light of the advantages to increasing the damping ability of the actuator arm, devices and modifications to the actuator arm have been proposed in the prior art that reduce the weight of the arms while attempting to increase the stiffness of the arms. Misso et al. (U.S. Pat. No. 5,627,701) disclose an E-block design in which each actuator arm is composed of a damping foam core with a non-porous stressed skin formed around the core. Ruiz et al. (U.S. Pat. No. 5,771,135) disclose a three part sandwich-design actuator arm that sandwiches the damping material between two suspensions. Although relatively lightweight, the manufacture of such a systems is complex, hence, the cost of manufacture is relatively large. Disk drives and their components are considered commodity products. Hence, the cost of the drive and the associated parts is a critical parameter in achieving sales of the product. Thus, there is strong incentive in the industry to find less costly ways of manufacturing actuator components.

One of the simplest and least expensive means of making actuator arms is through die-casting. This is because the major portion of the arm can be made as a unitary body at one time. However, there is a desire to further improve on the die-casting method of making actuator components by making the arms lighter and stronger. A proposed means of making the arms lighter while still maintaining the unitary body of having a die-cast body is by forming a hollow core in the arm that can then be filled with a substance. Die-casting that produces a hollow core suitable for actuator arms has not been achieved. Although Carden (U.S. Pat. No. 5,803,151) disclosed a method of making a hollow cavity in a structure, the process is limited to molten casting material. Further, it is not clear that this method would be suitable for actuator arms.

What is needed is an economical means by which damping can be improved in actuator components and other devices through hollow core die-casting, thixoforming, or other fluid material forming. The means of manufacturing the actuator component should take into account the desire for decreased weight and increased damping ability of the arm, as well as cost. Further, the E-block, actuator arm or other actuator component should be thermally stable to reduce distortion due to changes in the temperature due to use and/or the environment. The present invention is directed towards such a need.

SUMMARY OF THE INVENTION

It is therefore one object of the present invention to provide a method of manufacturing an actuator component with improved damping properties.

It is another object of the present invention to provide an actuator arm and method of manufacturing an actuator arm that is relatively lightweight without reducing the stiffness of the arm.

It is yet another object of the present invention to provide an actuator arm and method of manufacturing an actuator arm that is simple, thus, low in cost.

It is yet another object of the present invention to provide a solid component and method of manufacturing a solid component that creates a hollow core within the unitary hollowed body and allows the introduction of substances into the hollow core to alter the properties of the component.

It is yet another object of the present invention to provide a method of economically and reliably forming, by, for example, die-casting or thixoforming, an actuator component having a hollow core such that substances can be later injected into the core to improve its qualities.

The foregoing objects are achieved as is now described. A method of forming a computer component having improved damping capability is described. Typically, the component is an actuator component such as an actuator arm or E-block. The method comprises providing a die for forming an actuator component, inserting a water soluble salt article such as a salt block having a desired hollowing form into the die, and injecting formable materials, such as die-castable or thixoformable material, in fluid form into the die such that the fluid forms around the salt block and substantially covers the salt block. Once the die-casting fluid solidifies to form the actuator component, the solid actuator component is subjected to a solubilizing gas to dissolve the salt within the solid component, thus leaving a hollow core of the desired hollowing form. The salt block can have at least one feature which forms an outlet opening in the solid actuator component. The actuator component can be, for example, an actuator arm or an E-block for a computer hard drive.

The die-castable or thixoformable material can be any metal that can be reversibly transformed into a molten state, or a liquid that can transform to and/or from a liquid state and solid state. For example, the formable material can be a metal (such as aluminum, magnesium or zinc) or metal matrix composite. Further, the material can be a combination of the above with additives such as $Al_2O_3$, SiC, and other compounds.

If additional damping is required, the hollow arm can be filled with a high damping material. The substance that is injected into the hollow core of the solid component can be such substances as a low Tg adhesive, viscoelastic polymer or other foam, rubber, or polymer. The result of the invention is a simple to manufacture unitary body actuator component that can have the variable qualities of high strength and high damping.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
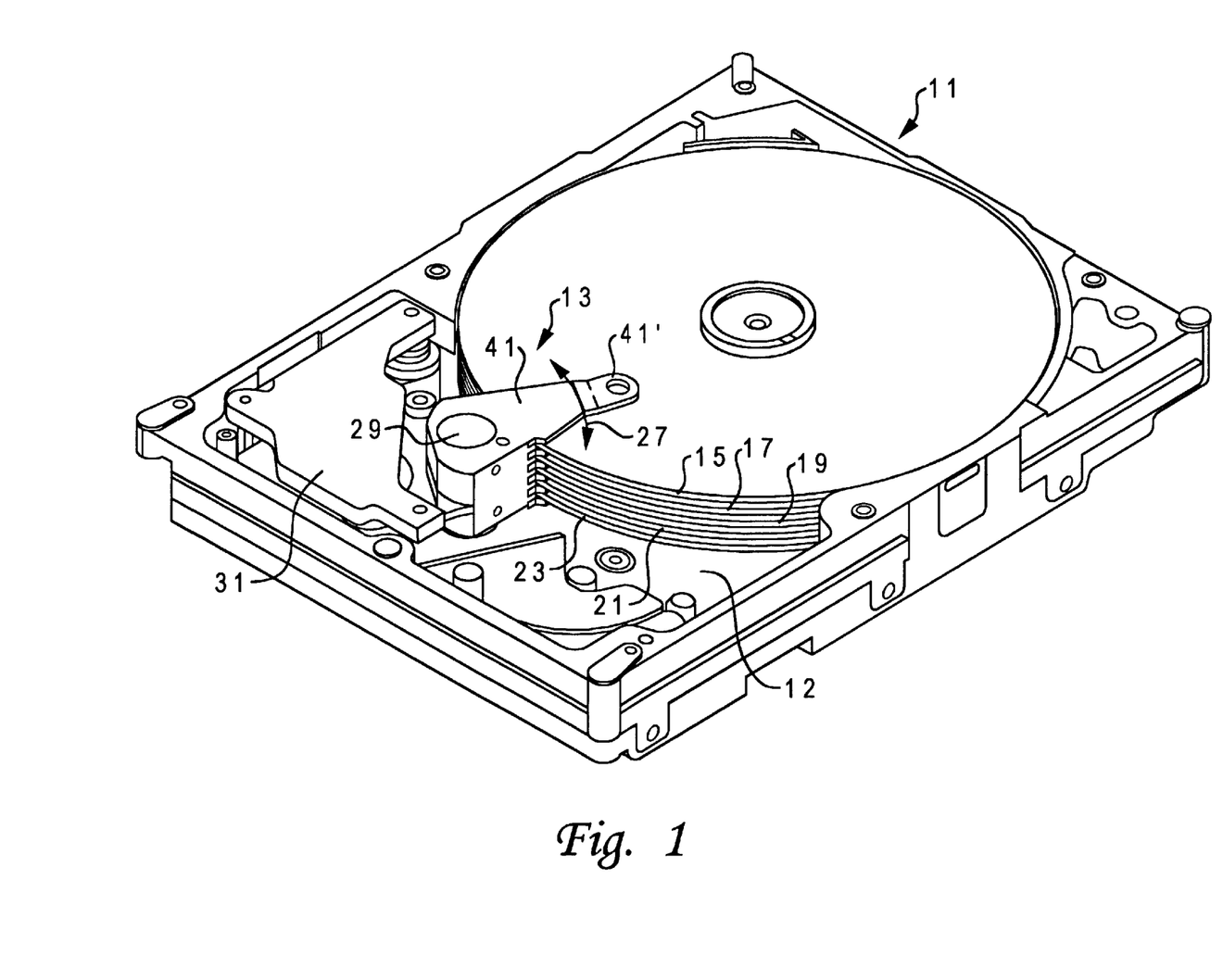
FIG. 1 is a perspective, partially schematic view of a computer hard drive having an actuator E-block assembly.

HOLLOW CORE ACTUATOR ARM. With reference now to the figures and in particular with reference to FIGS. 1 and 2, a hard drive assembly 11 is shown, the cover removed to show the details of the interior resting on base 12. The actuator component 13 is shown engaged with a stack of disks 15, 17, 19, 21 and 23. The actuator component in FIG. 1 is an E-block, the E-block having a plurality of actuator arms, one of which is arm 41, and each of which has a head (not shown), head swage hole 41' being associated with arm 41. The swage hole in the arm tip is used for attaching an HGA, a suspension to which is attached a slider containing a magnetic head for reading or writing data to the disks. Thus, each disk 15, 17, 19, 21, and 23 is associated with at least one actuator arm and head. There can be more or less disks in a computer hard drive, FIG. 1 depicting only one possible embodiment.

Figure 2:
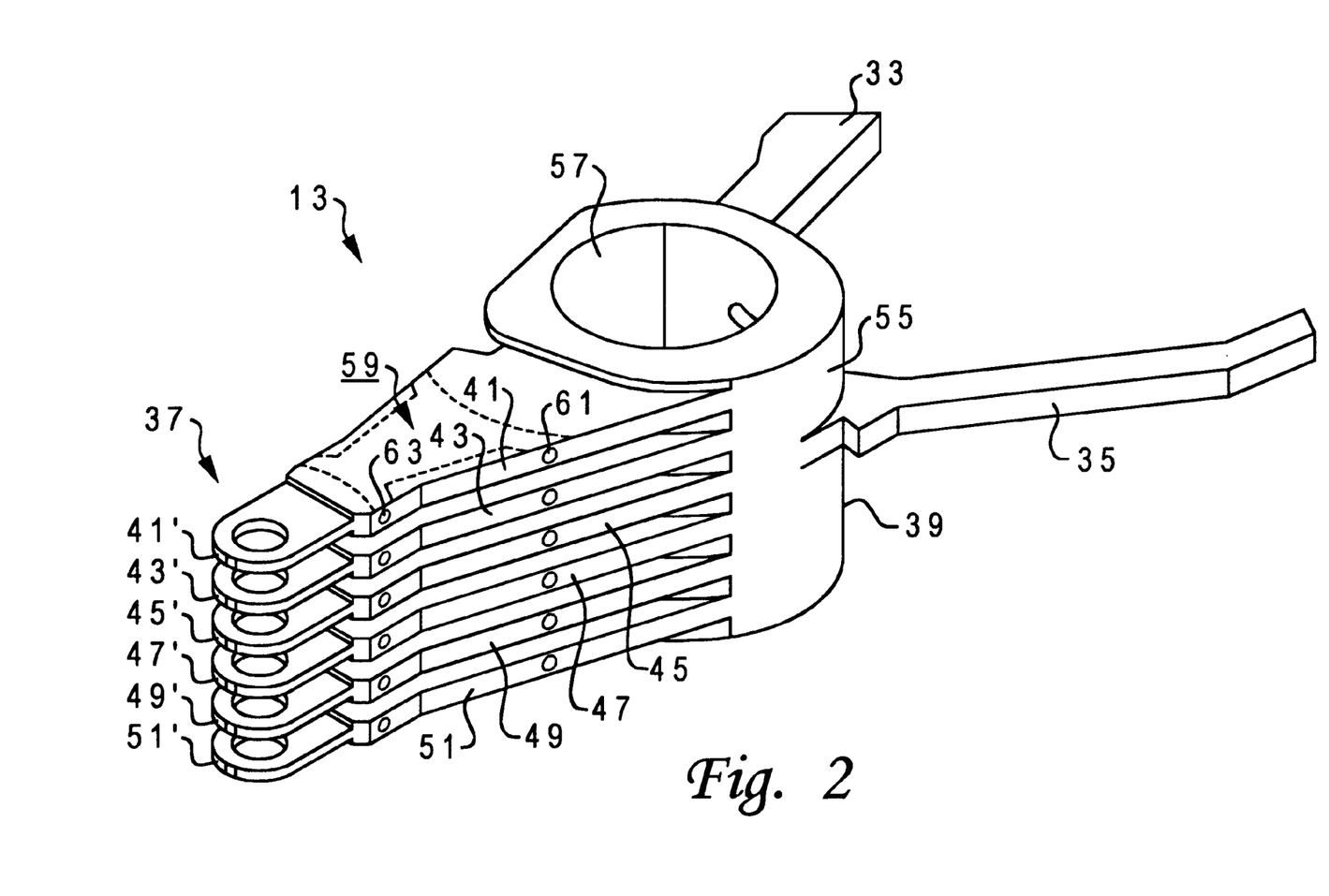
FIG. 2 is a isolated perspective view of an actuator E-block showing the hollow core in phantom lines.

The actuator component, in the present case an E-block 13, is shown in greater detail in FIG. 2. The actuator E-block has a proximal end 37 and distal end 39. There are a plurality of actuator arms 41, 43, 45, 47, 49, and 51 that have associated swage holes 41', 43', 45', 47', 49', and 51', respectively for locating HGAs. Each HGA is in turn associated with at least disks 15, 17, 19, 21, and 23, respectively. Each arm is associated with pivot bearing housing 55, from which legs 33 and 35 protrude. The legs are in turn associated with attachment of the voice coil motor (hidden from view) contained in housing 31 of FIG. 1.

Referring back to FIG. 1, pivot bearing 29 attaches the actuator E-block 13 to the hard drive base 12, the voice coil motor 31 used to rotate the E-block 13 about pivot bearing 29. The voice coil is associated with the arms 33 and 35 (shown in FIG. 2), which moves the assembly 13 in an arc 27 over the disk surfaces. This arc movement 27 of the actuator E-block 13 allows the read/write head located on the slider to fly over the appropriate data tracks located on the disks 15, 17, 19, 21, and 23. However, this movement creates momentum in each actuator arm located on the actuator assembly. When the component and/or actuator arm(s) stops over the disk, vibration is created in the assembly and each arm. The object of this invention is directed towards limiting the energy required to move the arm in arc 27, and to dampen the vibration resulting when the arm comes to a stop over a data track. The more efficient the damping and momentum reduction of the arm of the actuator component, the faster and more accurately data can be read.

Referring back to FIG. 2, the actuator component 13 is described further. The pivot bearing 29 (FIG. 1) is placed in the pivot bearing housing 55 of the actuator E-block, a pivot bearing cylinder formed by inner housing surface 57. Attached at the distal end of the actuator E-block are at least two legs 33 and 35. These legs, coupled the VCM, protrude from the pivot bearing housing into the VCM housing 31 so that its rotation can be controlled.

Located in each actuator arm is a hollow core, shown in FIG. 2 in phantom lines. The hollow core in actuator arm 41 is shown as hollow core 59. The hollow core resides generally within the thickness and width of the actuator arm, the core capable of being filled with a substance, discussed in greater detail infra. The hollow core 59 in the present embodiment is associated with 4 outlet openings, two of which are shown as 61 and 63. The hollow core can take on any number of shapes and have a number of desired outlet openings depending on the desired hollowing form used to make the core, the formation of the core described in greater detail infra.

Figure 3A:
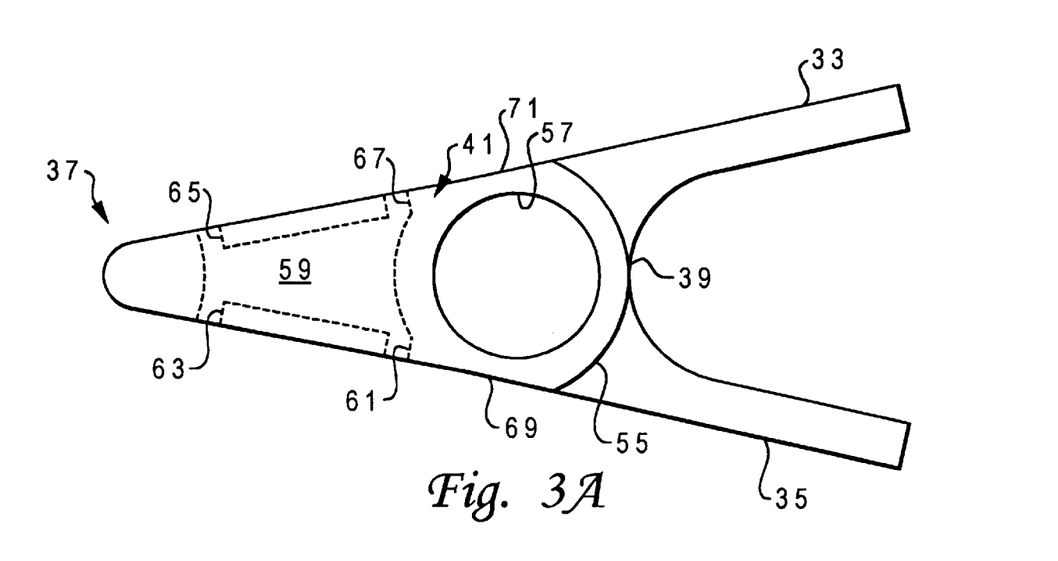
FIG. 3A is a top view of the E-block of FIG. 2 with the hollow core in phantom lines.
Figure 3B:
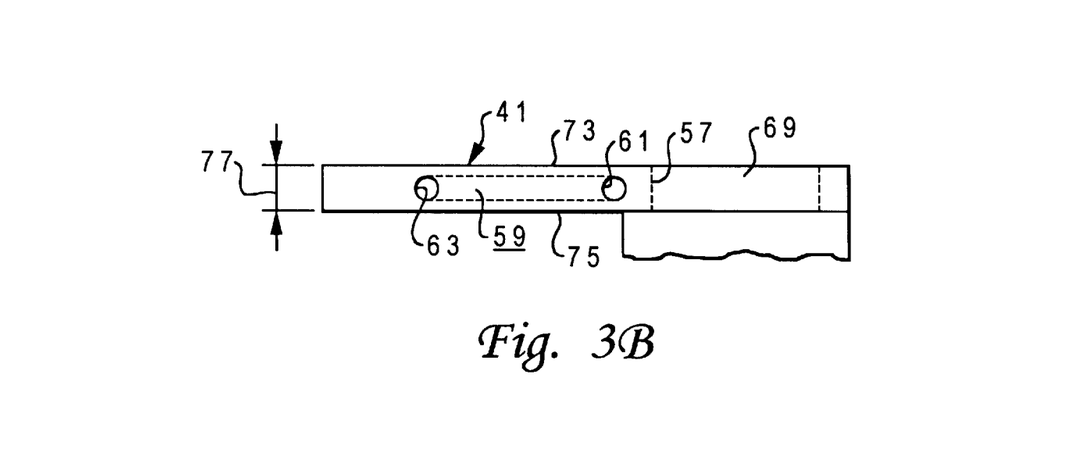
FIG. 3B is a side view of an actuator arm of the E-block from FIG. 2.

The actuator arm 41 is described in greater detail with reference to top and side views in FIGS. 3A and 3B, respectively. The arm 41 has sides 69 and 71 which generally converge to proximal end 37, and diverge at the distal end 39 to form legs 33 and 35. The actuator arm 41 has a width and thickness 77 defined by the sides 69 and 71, and arm top surface 73, and arm bottom surface 75. The hollow core 59 is shown as phantom lines as a generally trapezoid shaped core with 4 outlet openings 61, 63, 65, and 67. The outlet openings 61 and 63 are formed to exit the side 69, while outlet openings 65 and 67 are formed to exit side 71. The hollow core 59 is generally within the thickness 77 of the actuator arm and within the area defined by sides 69 and 71. It is to be understood that the hollow core can take many different shapes and sizes, depending upon the size and shape of actuator arm 41 or the desired degree of damping.

METHOD OF FABRICATING HOLLOW CORE. The hollow core of the actuator component is formed by placing a liquid or vaporized liquid (solubilizing gas) soluble salt formed into a solid article such as a block within the die used to form the actuator component. The salt is typically any sodium salt, but can be other materials that are soluble in water or organic solvents in the cool, heated, and/or heated-vaporized gas form. Wax or low melting point polymers may be added to the salt to bind the salt particles together during processing of the die and formable material in its fluid state. The block is placed where the hollow core is desired before the formable material is injected into the die. The formable material in liquid form--molten, melted, semi-solid thixoformable, or non-solidified reaction mixture--forms around the solid block of salt, leaving the block formed within the material as it solidifies either through cooling, drying, or reacting.

A number of different formable materials may be used in the present invention. The materials can be die-castable or thixoformable materials, but are not limited to such materials. For example, the material can be a metal such as Aluminum, Magnesium, or Zinc, or a metal matrix composite ("MMC") material such as an Aluminum matrix with one or more types of reinforcing particles selected from the group consisting of, but not limited to, $Al_2O_3$, SiC, SiB, BC, SiN ceramics, and Be and B alloys. The MMC materials are a family of materials that typically have higher stiffness (modulus), higher strength and other improved properties by the dispersion of a high stiffness, high strength ceramic reinforcement phase in a metal matrix.

It is desirable to make the actuator arm from material that is rigid, lightweight, and of high damping quality. Since it is difficult to achieve stiffness and high damping qualities within one material, it is desirable to combine two different materials and substances into one actuator arm in as few steps as possible, as this invention discloses. The die-castable or thixoformable material forms the required rigidity of the actuator arm, while the substance injected into the hollow core imparts improved damping ability to the actuator arm.

Figure 4A:
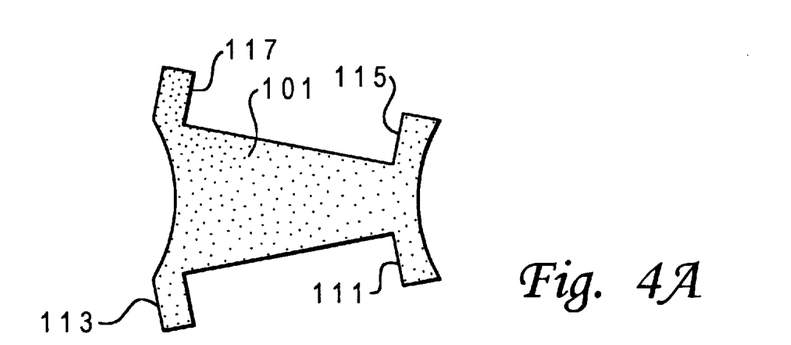
FIG. 4A is a top view of a solid salt block of the invention.
Figure 4B:
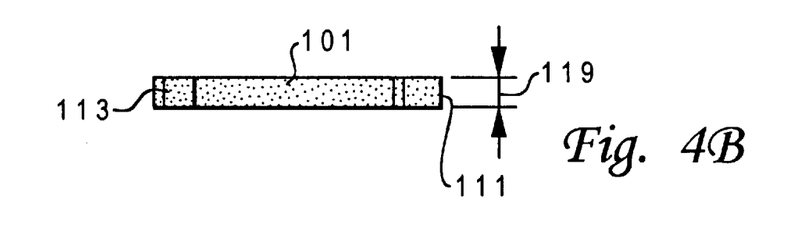
FIG. 4B is a side view of the solid salt block shown in FIG. 4A.

The salt article can have any hollowing form that is desirable, but typically will be in a form that fits within the thickness defined by the actuator arms as described above. In one embodiment of the present invention, FIG. 4A and FIG. 4B shows a salt block 101 in the general shape of a trapezoid. It is often desirable to form the shape of the salt block in the general shape of the actuator arm, as in the present embodiment.

Salt block 101 has 4 outlet tabs 111, 113, 115, and 117. These outlet tabs will form the outlet openings (as in 61 and 63 described supra). These openings allow the salt to be washed away using pressurized steam and allow for subsequent injection of substances into the hollow core (as in 59 described supra) left after dissolving and removing the salt. The salt block 101 has a thickness 119, the thickness being generally less than the thickness 77 of the actuator arm. Salt block 101 is but one embodiment of any number of different salt blocks which may have different shapes, sizes, and number of outlet tabs.

The die 121 for casting an actuator E-block is described with reference to FIG. 5. The die has a number of compartments for forming the various features of the actuator component, each compartment defined by various surfaces within the die. The inside surface 123, along with the surfaces 125, 127, 129, 131, 133, 127', 129', 131', and 133', defines cavity 102 from which the actuator component is formed once the formable material injected within solidifies. Specifically, inside surface 123 forms the pivot bearing housing, inside surface 125 forms the legs of the actuator E-block, while inside surfaces 127, 129, 131, and 133 form actuator arms, and inside surfaces 127', 129', 131', and 133' form the arm tips associated with the swaging of the suspensions, respectively. Placed within each space which will form the actuator arms is at least one salt block 101, 103, 105, and 107. Although FIG. 5 shows only one salt block within each compartment, more than one salt block may be placed within the compartment that forms the actuator arms, or other compartments within the die.

Figure 5:
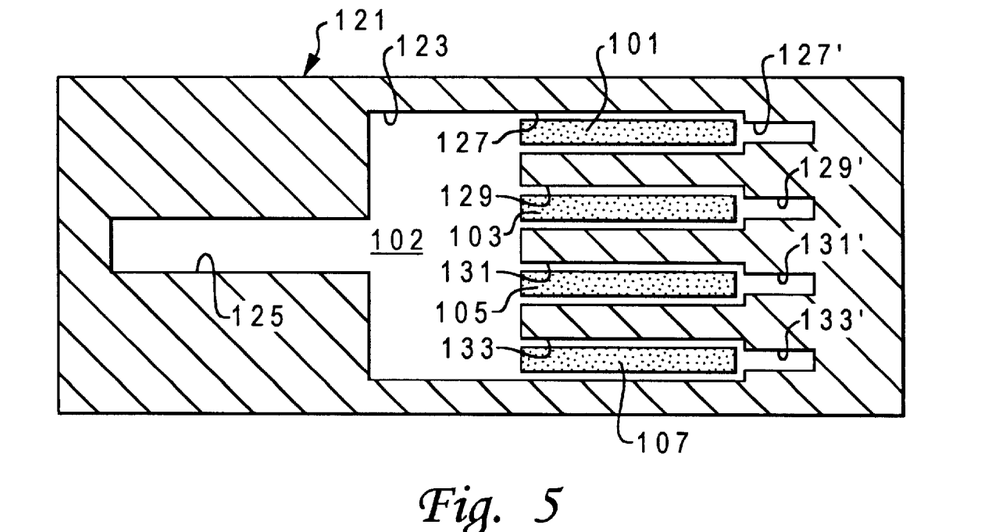
FIG. 5 is a cutaway side view of a die for forming an E-block with the solid salt blocks in the desired location within the die-cast.

Although FIG. 5 shows a typical die-casting procedure, the present invention is not thus limited, but can be implemented with cold-chamber die-casting, hot-chamber die-casting, squeeze casting, thixoforming, rheocasting, fluid monomer polymerization to form a solid polymer, and other means of forming a unitary component from a fluid material that solidifies to form a solid. The method of thixoforming is described, for example, in *Light Metal Age* (June 1996) by A. I. Nussbaum, wherein the billet stock would be any suitable thixoformable material for making actuator arms or E-blocks.

Figure 6A:
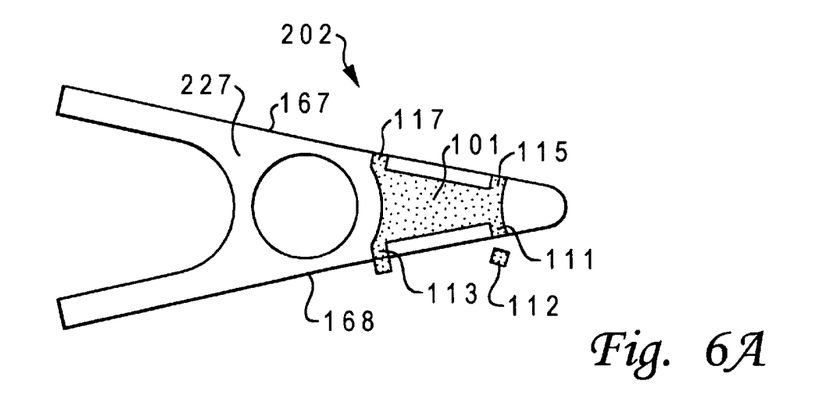
FIG. 6A is a top view of the E-block formed from the die of FIG. 5 with the salt block in the form.
Figure 6B:
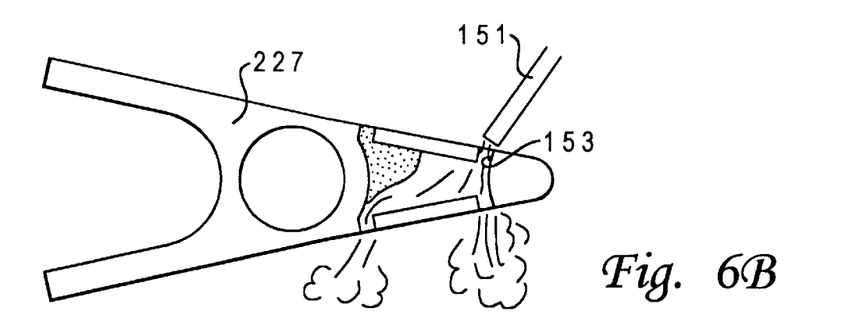
FIG. 6B is a top view of the E-block showing the salt being removed by steam.

Referring to FIGS. 6A–6B, the process for removing the salt block having the desired hollowing form from the finished die-cast actuator component 202 is described. Once the material injected into the die-cast solidifies, the solid component thus formed is removed from the die-cast mold. The die form 102 results in solid die-cast or thixoformed E-block 202. The E-block shown in the embodiment of FIG. 6A (202) is similar to the embodiment shown in FIG. 2 (13). The top view of the E-block 202 highlights the process of removing salt from actuator arm 227 formed from inside surface 127 of the die. Although the present embodiment of the invention shows an actuator arm being formed from a die, the invention lends itself to numerous other molds for any component in a computer or other electro-mechanical device where a combination of substances with a variety of properties is desired to be combined into a unitary formed body, such as the unitary actuator arm of a computer hard drive. The thus formed unitary body from the die is formed in one step with little or no machining required, and easily amenable to injection of damping substance or other substances, the description of which is infra.

Salt block 101 is formed into the solid component 202 with outlet tabs 111, 113, 115 and 117 extending outward to the side surfaces 167 and 168, thus exposed at those locations once removed from the die. A piece 112 of the outlet tab 111 may extend from the side 168 such that it can be first broken off mechanically. A solubilizing gas such as heated and/or pressurized water or organic solvent can be used to remove the soluble salt block. For example, pressurized steam is then injected through a small tube 151, allowing the pressure and steam to be directed at one of the outlet cores, in this case outlet tab 115. The steam dissolves the salt away, the solubilized salt washing out of the outlet openings formed from the dissolution of the salt, in this case outlet openings 157 and 159. This leaves hollow core 201 within the actuator arm in the shape of the original hollowing form of the solid salt block 101. There is a need for at least one outlet opening to be formed in the actuator arm to allow salt to be removed, but one outlet may be sufficient to act as a location for subjecting the salt within to a solubilizing gas and allowing for the solubilized salt to flow out of the formed component.

Figure 6C:
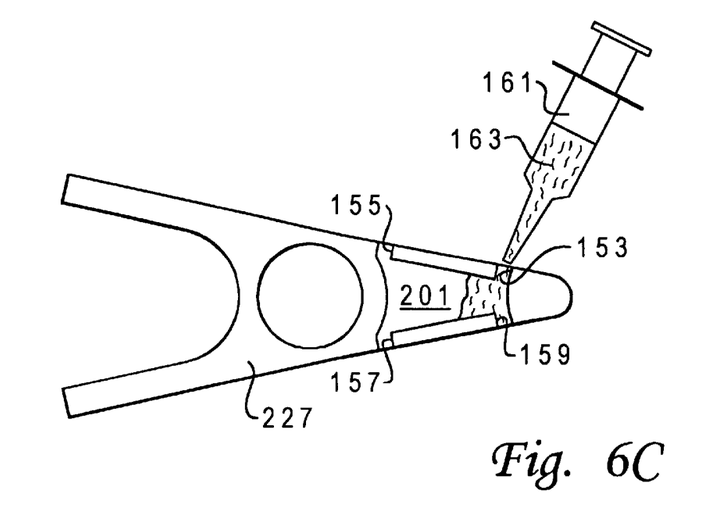
FIG. 6C is a top view of the showing the hollow core being filled with a damping substance.

Next, an injecting device such as a syringe or injection molding equipment 161 can be used to inject a damping substance 163 into one of the outlet openings, in this case 153 in FIG. 6C. The substance is typically in a liquid and/or solution form such that it flows into hollow core 201 and fills the core completely. The substance 163 can be, for example, a viscoelastic polymer, an adhesive with a Tg matching the operation temperature of the drive, or other low density polymer, foam, or rubber. It is important that the injected substance 163, once in solid or stabilized form, have a high damping ratio in order to improve the damping ability of the actuator arm. A high damping ratio will reduce the vibration or settle time of the actuator arm, thus improving its performance.

Figure 7:
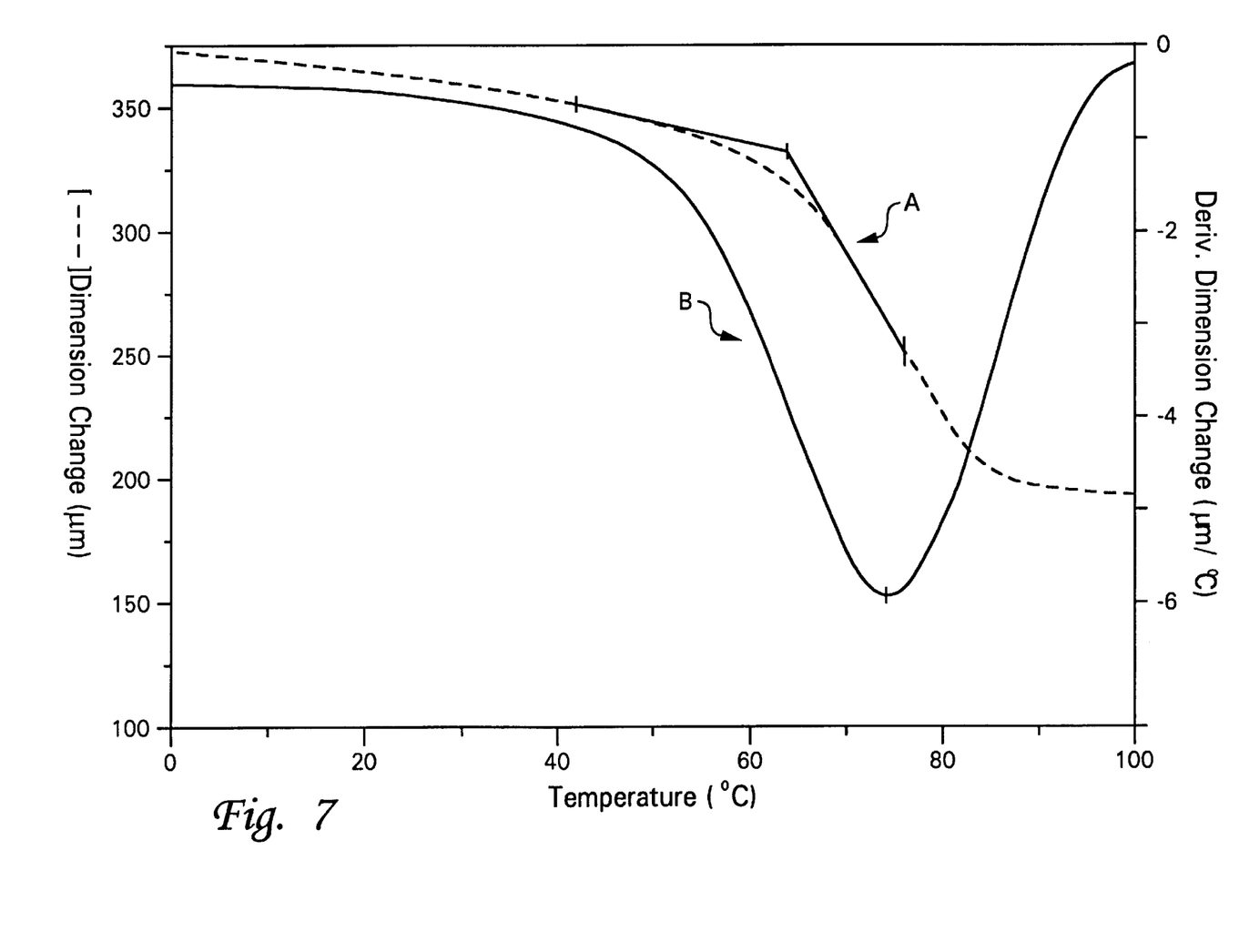
FIG. 7 is a plot of Dimension Change (micrometers) and Derivative Dimension Change (micrometers/° C) as a function of Temperature (° C) for an epoxy adhesive damping substance.

For damping substances such as low density, amorphous polymers having a desirable Tg, there are some important characteristics in relation to the present invention. The delayed reaction of a polymer to stress and strain affects its dynamic properties. If a simple harmonic stress of angular frequency is applied to a solid polymer sample, the strain lags behind the stress by a phase angle whose tangent measures the internal friction. The internal friction is a maximum when the dynamic modulus of the material (the ratio of the stress to that part of the strain which is in phase with the stress) is in a region of relaxation. This relationship can be shown graphically, wherein the internal friction or modulus (the amount of movement in the material) as a function of temperature. For the present invention, an epoxy adhesive with a Tg between about 55 to 95° C. is desirable. A plot of Dimension Change (micrometers/° C.) as a function of Temperature (° C.) is shown in FIG. 7 for one epoxy adhesive of the present invention, the S-shaped curve A being the actual data and the bell-shaped curve B the derivative of the data curve.

The thus completed actuator component can be completed in three steps: (1) die-casting or thixoforming, (2) clearing of the solid salt block, and (3) injection of desired damping substance. This three-step process is not only novel, but has many advantages over the prior art.

The die-cast or thixoforming method creates a unitary body in one step using materials that have a low mass and high strength, while allowing for the addition of damping materials.

Also, the invention allows for flexibility in designing the size and shape of the damping material since the salt block that forms the hollow core can be easily changed from one shape to another.

The method for increasing the damping ratio is relatively simple, only adding one step to the process and does not require costly procedures or machining. Thus, the cost of the components made using the method of the present invention will be lower than other techniques.

Also, the method of the invention can be applied to numerous types of die-cast structures and components where hollow core is desired which is capable of being filled with some substance.

While the invention has been particularly shown and described with reference to a preferred embodiment, it will be understood by those skilled in the art that various changes in form and detail may be made therein without departing from the spirit and scope of the invention.

What is claimed is:

1. A method of forming a computer component having improved damping capability, the method comprising:
   providing a die;
   inserting into the die a soluble salt article having a desired hollowing form with at least one outlet tab;
   injecting formable material in a fluid state into the die around the salt article and substantially covering the salt article;
   allowing the formable material to solidify to form a solid component wherein at least one outlet tab is exposed;
   subjecting the at least one outlet tab to solubilizing gas or liquid to dissolve the salt within the solid component to form a hollow core computer component; and
   injecting a damping substance into the hollow core formed in the solid component thereby forming a computer component having improved damping capability.

2. The method of claim 1, wherein the damping substance is a viscoelastic polymer.

3. The method of claim 1, wherein the damping substance is an adhesive with a Tg matching the operation temperature of a computer hard drive.

4. The method of claim 1, wherein the damping substance is a polymer, foam, or rubber with low density and high damping ratio relative to the formable material.

5. A method of forming a computer component having improved damping capability, the method comprising:
   providing a die;
   inserting into the die a soluble salt article having a desired hollowing form;
   injecting a formable material in fluid form into the die around the salt article to substantially cover the salt article;
   allowing the formable material to solidify to form a computer component;
   subjecting the solid computer component to solubilizing gas or liquid to dissolve the salt within the solid component to form a hollow core computer component; and
   injecting a damping substance into the hollow core formed in the computer component thereby forming a computer component having improved damping capability.

6. The method of claim 5, wherein the damping substance is a viscoelastic polymer.

7. The method of claim 5, wherein the damping substance is an adhesive with a Tg matching the operation temperature of a computer hard drive.

8. The method of claim 5, wherein the damping substance is a polymer, foam, or rubber with low density and high damping ratio relative to the die-castable material.

* * * * *